E. J. FARKAS.
DETACHABLE TREAD FOR TRACTOR WHEELS.
APPLICATION FILED JAN. 13, 1921.
1,423,519.
Patented July 25, 1922.
2 SHEETS—SHEET 1.
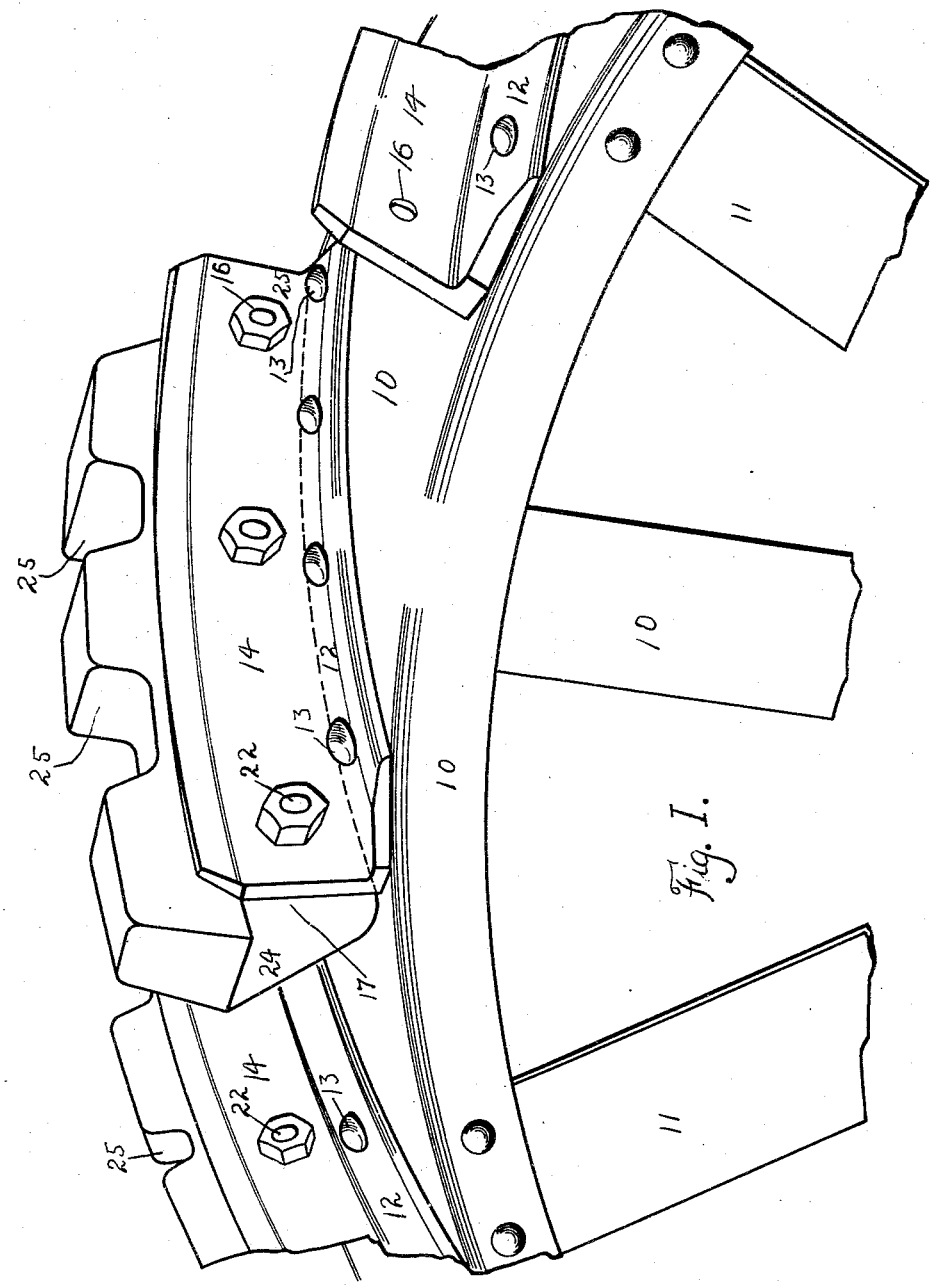
Fig. I.
WITNESS:
J. M. Cahill
INVENTOR.
EUGENE J. FARKAS
BY
J. K. Harness
ATTORNEY.

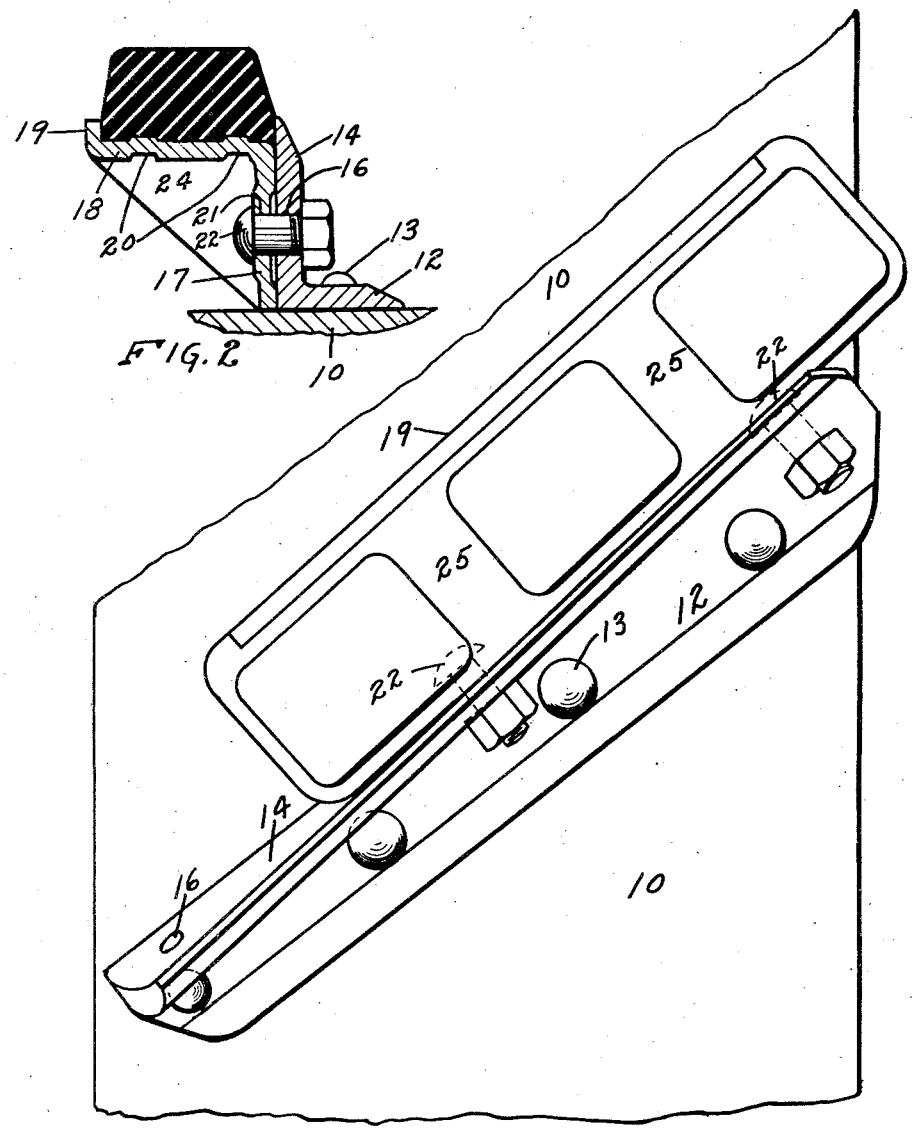

UNITED STATES PATENT OFFICE.

EUGENE J. FARKAS, OF DETROIT, MICHIGAN, ASSIGNOR TO FORD MOTOR COMPANY, OF HIGHLAND PARK, MICHIGAN, A CORPORATION OF DELAWARE.

DETACHABLE TREAD FOR TRACTOR WHEELS.

1,423,519.　　　　　Specification of Letters Patent.　　Patented July 25, 1922.

Application filed January 13, 1921. Serial No. 436,889.

*To all whom it may concern:*

Be it known that I, EUGENE J. FARKAS, a citizen of the present domain of Hungary, having applied for and received my first papers for naturalization in the United States, residing at Detroit, in the county of Wayne and State of Michigan, have invented new and useful Improvements in a Detachable Tread for Tractor Wheels, of which the following is a specification.

The object of my invention is to provide new and useful improvements in a detachable tread for tractor wheels of simple, durable, and inexpensive construction.

A further object of my invention is to provide a detachable tread for tractor wheels so that the tractor wheel need not be altered when it is desired to change the wheels so that they may be run over pavements or other smooth surfaces. In this connection it will be noted that tractor wheels are ordinarily provided with extended cleats or lugs which enter the ground thereby giving the wheel traction and that these lugs seriously damage pavements and the like when it is necessary for any reason to run the tractor over the latter. With the foregoing explanation in view it is the object of my invention to provide a tread which may be quickly attached or detached when the occasion arises and which may have associated therewith compressible pads or tread members so that the detachable tread may have the function of a rubber tire.

A further object of my invention is to provide a tractor wheel tread which may utilize the tractor wheel without material alteration on account of the attaching means.

With these and other objects in view, my invention consists in the arrangement, combination, and construction of the various parts of my improved device, as described in the specification, claimed in my claims, and shown in the accompanying drawings, in which:

Figure 1 is a perspective view of the upper portion of a tractor wheel showing my improved tread members attached to certain of the lugs provided with a tractor wheel and a portion of one of the lugs from which the tread member has been removed, Figure 2 is a vertical, sectional view illustrating the construction of my improved tread member, and Figure 3 is a top or plan view of a portion of a tractor wheel showing one of the lugs thereon and the tread member attached thereto.

Referring to the accompanying drawings I have used the reference numeral 10 to indicate, generally, the rim of a tractor wheel having spokes 11 secured to the rim at intervals around its periphery, and angle iron cleats having one web thereof secured to the rim by the rivets 13. The second web 14 projects from the rim and enters the ground to give the tractor wheel traction, as is customary with such lugs. In this connection it is suggested that these tractor wheel lugs must be very securely fastened to the rim or wheel as a very small portion of the lug is oftentimes called upon to carry the entire weight of the tractor in addition to the force of the impact caused by the movement of the tractor. It is, therefore, desirable that these lugs should not be detached from the tractor wheel rim, as it is not practical for the ordinary tractor owner to replace the lug in such a manner that it will withstand the strain. It will also be noted that the extending web or blade of these lugs is provided with a plurality of spaced openings 16. These openings 16 are designed to permit attachment of extension lugs to the stationary lug and I have so arranged my improved tread member that these openings 16 and the blade portion of the lug may be used for supporting the tread members. The tread member comprises a supporting bracket which adjacent to the central portion thereof is angular in cross section, one web 17 thereof being disposed against the blade portion of the lug and the other web 18 being substantially parallel with a rim of the wheel and at right angles to the blade portion. This portion 18 is spaced inwardly from the outer edge of the blade portion 14 a definite distance. The portion 18 has at its free edge an outwardly extending flange 19 which is of substantially the same width as the extending portion of the blade 14. The web 18 also has a plurality of beads 20 therein for a purpose which will hereinafter be made clear. The web 17 of the supporting member is provided with a pair of openings 21 designed to register with certain of the openings 16 and the lower edge of the web 17 is designed to rest against the wheel rim 10. It will therefore be seen that when bolts 22 are extended through alined openings 21 and 16 then that the web 17 of the supporting member will be drawn tightly against the blade 14 so that force exerted against the web 18 will be transmitted to the blade 14 which is substantially unbreakable and unbendable as compared with the strains to which it may be subjected in ordinary conditions. The engagement of the web 17 with the blade 14 is made more rigid by offsetting the central portion of the web 17 so that tightening the bolt 22 tends to force the edge portions of the web 17 against the blade 14 thereby presenting what may be termed a truss structure to prevent relative movement of these parts. It will be noted in this connection that relative movement of these two parts must be prevented as very slight movement would result in a large amount of wear due to the varied pressures and impacts to which the tread is subjected. The end portions of the supporting member are turned over to form a unitary or integral triangular brace portion 24 which further braces the web 18 relative to the web 17. These portions 24 form a truss structure with the well known strength of the diagonal brace type of truss. A compressible tread member is vulcanized to the outer surface of the web 18 and this tread member in the form here shown is provided with spaced channels 25 so that the tread has what may be termed three contact pads which bear against the surface over which the tractor may be running. This feature is highly important as it eliminates to a large extent trouble caused by the tractor wheel slipping or skidding. Due to the beads 20 in the web 18 and due to the fact that the tread member is vulcanized to the web 18 under pressure the tread member will wear out due to its use rather than become accidentally detached from the supporting member. The tread member is further supported against forces which tend to tear it off from the supporting member by the flange 19 and the extending portion of the blade 14. These substantially eliminate the danger that any projection along the road surface may catch the base of the tread member and thereby tear loose the tread from the supporting member. They also compress the tread member slightly adjacent to its base so that they materially assist in holding it in place.

Among the many numerous advantages resulting from the use of my improved device it may be mentioned that the tread members may be readily installed or removed therefrom although they are rigidly attached to the wheel so that they will not be accidentally displaced or damaged by ordinary usage. It may also be mentioned that the tractor wheel need not be altered, at least in the case of tractors having a blade lug with the openings already therein for attaching extension lugs. Even though the openings necessary for attaching the tread might have to be made in the lugs with an ordinary tractor wheel this may be accomplished with comparatively little effort and the lug will not be materially weakened thereby. Further the treads provided may be readily stored or transported and occupy a minimum amount of space in either case. Further these treads do not very materially affect the traction afforded by the tractor wheel in case the tractor is run over a pavement or other hard surface onto a muddy road. These treads are also readily cleaned in case they become caked with mud; they are so shaped as to present a minimum surface to which mud may adhere and the tread portion proper may be replaced when worn down to position flush with the flanges 19 and extending portion of the plate 14. It will therefore be seen that my tread may be used without weakening or altering the ordinary tractor wheel materially and that they have a large number of advantages.

Some changes may be made in the arrangement and construction of the various parts of my improved device without departing from the spirit of the invention therein, and it is my intention to cover by my claims such changes as may be reasonably included within the scope thereof.

I claim as my invention:

1. In a device of the class described a tractor wheel having a rim, a plurality of lugs secured thereto having blade portions extending from the rim, said blade portions having spaced openings therein, a supporting member of angular cross section having openings in one web thereof to register with the openings in said blade, attaching means removably mounted in said alined openings, diagonal brace members formed integral with the webs of the supporting member at the ends thereof and a somewhat resilient tread member secured to the second web member.

2. In a device of the class described a tractor wheel having a rim, a plurality of lugs secured thereto having blade portions extending from the rim, said blade portions having spaced openings therein, a supporting member of angular cross section having openings in one web thereof to register with the openings in said blade, attaching means removably mounted in said alined openings, diagonal brace members formed integral with the webs of the supporting member at the ends thereof and a somewhat resilient tread member vulcanized to said second web of the supporting member and provided with a plurality of channels therein whereby said tread member may be divided into a plurality of contact pads.

3. In a detachable somewhat resilient tread member a supporting member having an angular cross section intermediate of its ends, and diagonal brace portions connecting the webs thereof, one of said webs having a plurality of spaced openings therein, an off-set portion formed adjacent to said openings in the last described web, beads formed in the second web of the supporting member and a somewhat resilient tread member secured to said second web and beads.

4. In a device of the class described, a rim, a plurality of spaced lugs secured thereto having blade portions extended from the rim, said blade portions having spaced openings therein, a strip of angle iron having spaced openings in one web thereof, means extended through the openings in the lugs and angle iron to detachably secure them together, and a somewhat resilient tread member secured to the second web of the angle iron.

5. In a tread member for tractor wheels, a lug having an extending blade portion, a tread supporting member secured to the blade portion in position spaced inwardly from the outer edge of the blade portion, an outwardly directed flange on the supporting member, and a somewhat resilient member secured to the supporting member between said flange and the extending edge of the blade portion.

6. In a device of the class described, a rim, a plurality of spaced lugs secured thereto having blade portions extended from the rim, said blade portions having spaced openings therein, a strip of angle iron having spaced openings in one web thereof, means extended through the openings in the lugs and angle iron to detachably secure them together, diagonal brace members extended between the webs of the angle iron, and a somewhat resilient tread member secured to the second web of the angle iron.

7. In a tread member for tractor wheels, a lug having an extending blade portion, a tread supporting member secured to the blade portion in position spaced inwardly from the outer edge of the blade portion, diagonal brace members extended between the tread supporting member and the blade portion, an outwardly directed flange on the supporting member, and a somewhat resilient member secured to the supporting member between said flange and the extending edge of the blade portion.

EUGENE J. FARKAS.

Witness:
J. EMMET HALL.